United States Patent
Flender et al.

(10) Patent No.: US 10,309,268 B2
(45) Date of Patent: Jun. 4, 2019

(54) ADJUSTABLE CAMSHAFT

(71) Applicant: Mahle International GmbH, Stuttgart (DE)

(72) Inventors: Thomas Flender, Eberdingen (DE); Michael Kreisig, Gerlingen (DE); Juergen Rommel, Burgstetten (DE); Stefan Steichele, Gerlingen (DE)

(73) Assignee: Mahle International GmbH (DE)

( * ) Notice: Subject to any disclaimer, the term of this patent is extended or adjusted under 35 U.S.C. 154(b) by 78 days.

(21) Appl. No.: 15/367,136

(22) Filed: Dec. 1, 2016

(65) Prior Publication Data
US 2017/0159512 A1    Jun. 8, 2017

(30) Foreign Application Priority Data
Dec. 2, 2015    (DE) .......................... 10 2015 224 012

(51) Int. Cl.
| F01L 1/34 | (2006.01) |
| F01L 1/344 | (2006.01) |
| F01L 1/047 | (2006.01) |
| F16H 53/04 | (2006.01) |

(52) U.S. Cl.
CPC .......... *F01L 1/34413* (2013.01); *F01L 1/047* (2013.01); *F16H 53/04* (2013.01); *F01L 2001/0473* (2013.01); *F01L 2001/0476* (2013.01)

(58) Field of Classification Search
CPC .................. F01L 1/34413; F01L 1/047; F01L 2001/0476; F01L 2001/0473; F16H 53/04
See application file for complete search history.

(56) References Cited

U.S. PATENT DOCUMENTS

| 4,826,346 | A | * | 5/1989 | Nishiura | ................. | B23P 11/00 |
| | | | | | | 403/265 |
| 5,307,768 | A | * | 5/1994 | Beier | ...................... | F01L 1/047 |
| | | | | | | 123/90.17 |
| 2010/0108004 | A1 | | 5/2010 | Lettmann et al. | | |
| 2010/0147104 | A1 | * | 6/2010 | Ueno | ...................... | F01L 1/047 |
| | | | | | | 74/567 |

(Continued)

FOREIGN PATENT DOCUMENTS

| DE | 19520117 A1 | 12/1996 |
| DE | 102012022800 A1 | 5/2014 |

(Continued)

OTHER PUBLICATIONS

European Search Report dated Mar. 27, 2017 corresponding to related European Application No. 16198247.5.
English abstract for DE—102014116774.

*Primary Examiner* — Zelalem Eshete
(74) *Attorney, Agent, or Firm* — Fishman Stewart PLLC

(57) ABSTRACT

An adjustable camshaft may include an inner shaft and an outer shaft disposed coaxial therewith. A first cam may be connected non-rotatably to the inner shaft, and a second cam may be connected non-rotatably to the outer shaft. At least two bearing elements may be connected fixedly to the outer shaft. The first cam may be disposed between the at least two bearing elements. The at least two bearing elements may fix the first cam in an axial direction relative to the outer shaft, and the at least two bearing elements via the first cam may fix the inner shaft in the axial direction relative to the outer shaft.

13 Claims, 2 Drawing Sheets

(56) References Cited

U.S. PATENT DOCUMENTS

2011/0303173 A1  12/2011  Dietel et al.
2015/0167506 A1   6/2015  Kim

FOREIGN PATENT DOCUMENTS

| | | |
|---|---|---|
| DE | 102013207355 A1 | 10/2014 |
| DE | 102014116774 A1 | 6/2015 |
| DE | 102014110674 A1 | 2/2016 |
| GB | 2420397 A | 5/2006 |
| JP | 3198772 B2 | 8/2001 |

* cited by examiner

ADJUSTABLE CAMSHAFT

CROSS-REFERENCE TO RELATED APPLICATIONS

This application claims priority to German Patent Application No. 10 2015 224 012.6, filed Dec. 2, 2015, the contents of which are hereby incorporated by reference in its entirety.

TECHNICAL FIELD

The present invention relates to an adjustable camshaft with an inner shaft and an outer shaft disposed coaxial therewith. The invention relates moreover to an internal combustion engine with such a camshaft.

BACKGROUND

Generic camshafts are sufficiently well known and are used in particular for the variability with regard to the valve opening duration. In order to enable a long-term reliable operation, it is necessary to mount both the inner shaft and the outer shaft in an axial direction. In particular, this is also of great importance since the cams pinned to the inner shaft can only be adjusted effortlessly if the pins passed into corresponding elongated holes of the outer shaft do not rub, i.e. come into contact with an edge of the respective elongated hole. In order to adjust such adjustable camshafts, a phase adjuster is normally used with a rotor and a stator, wherein the rotor is fixedly connected to the inner shaft and fixedly to the stator of the phase adjuster in the axial direction. The stator of the phase adjuster is in turn connected to the outer shaft in the axial direction. Both the outer shaft as well as the inner shaft are thus fixed in the axial direction by means of the phase adjuster, i.e. specifically by means of the stator and the rotor of the phase adjuster.

SUMMARY

The present invention deals with the problem of providing an improved or at least an alternative embodiment for a camshaft of the generic type, wherein axial bearing of the inner shaft is to take place in particular without direct fixing to a rotor of a phase adjuster.

According to the invention, this problem is solved by the subject-matter of the independent claim(s). Advantageous embodiments are the subject-matter of the dependent claims.

The present invention is based on the general idea of mounting an inner shaft of an adjustable camshaft not as previously in the axial direction on a rotor of a phase adjuster, but rather of bringing about this axial bearing via the outer shaft. In particular, a floating bearing in the axial direction of the inner shaft relative to a rotor of the phase adjuster is thus possible, which in particular enables simplified assembly and better compensation of manufacturing tolerances. The adjustable camshaft according to the invention comprises, in a known manner, an inner shaft and an outer shaft disposed coaxial therewith as well as a first cam, which is connected non-rotatably to the inner shaft, and a second cam, which is connected non-rotatably to the outer shaft. According to the invention, at least two bearing elements connected fixedly to the outer shaft are provided, between which bearing elements the first cam is disposed and which fix the first cam and, via the latter, also the inner shaft in the axial direction relative to the outer shaft. In this case, therefore, axial bearing of the camshaft is thus possible or feasible solely by means of the outer shaft, since the inner shaft is fixed in the axial direction by the outer shaft and does not therefore require its own external bearing. In the same way, the camshaft according to the invention also enables an axial bearing of the inner shaft on a rotor of a phase adjuster, without the outer shaft having to be fixed separately to the stator of the phase adjuster in the axial direction, since the outer shaft is fixed by the inner shaft in the axial direction in the case of the camshaft according to the invention.

In an advantageous development of the solution according to the invention, further first cams and second cams are provided, wherein however only one of the first cams is fixed by bearing elements. The first cam, which is disposed directly adjacent to the phase adjuster, is usually used for the axial bearing. It is of course clear that the camshaft according to the invention can comprise further first cams connected to the inner shaft and second cams connected to the outer shaft.

In a further advantageous embodiment of the solution according to the invention, at least one bearing element is constituted as a second cam. In such an embodiment, at least one second cam thus forms one of the bearing elements, so that the latter does not have to be formed by a separate bearing element, for example a bearing ring, as a result of which not only a facilitation of assembly, but also optimisation of installation space and a cost advantage can be achieved.

In a further advantageous embodiment of the solution according to the invention, at least one bearing element is constituted as a bearing ring, wherein such a bearing ring or generally a bearing element can be fixedly connected to the outer shaft by a firmly bonded, friction-locked or form-fit connection. The bearing element can be fixed on the outer shaft for example by a thermal joint fitting, by welding, by soldering, by adhesive bonding or by a press-fit. This non-comprehensive list already gives an idea of the diverse production options that exist for fixing the bearing element or the bearing ring on the outer shaft.

At least one bearing element expediently engages in a groove on the outer shaft and is moreover fixed in the axial direction. In addition or as an alternative to the aforementioned fixing of the bearing element on the outer shaft, the latter can of course also be connected to the outer shaft by a kind of form-fit connection, for example whereby such a bearing element engages in an associated groove constituted complementary thereto on the outer shaft of the camshaft.

In a further advantageous embodiment of the solution according to the invention, a distance element, in particular a sleeve, is disposed between the first cam and the bearing element. This offers the great advantage that such a sleeve can be pushed relatively easily onto the outer shaft of the camshaft, wherein the sleeve is supported for example on the one hand on a bearing element formed by a second cam and on the other hand on the first cam. In this case, therefore, at least one of the bearing elements would be a second cam, which without the distance elements would however be too far away from the first cam in the axial direction to fix the latter in the axial direction. This is where the distance element according to the invention comes in, which bridges this axial distance and supports the first cam with respect to the bearing element or in particular with respect to the second cam in the axial direction.

The phase adjuster expediently comprises a rotor and a stator, the stator whereof is connected axially fixed to the outer shaft and the rotor whereof is connected axially mobile to the inner shaft, or the stator whereof is connected axially mobile to the outer shaft and the rotor whereof is connected axially fixed to the inner shaft, or the stator whereof is connected axially mobile to the outer shaft and the rotor whereof is connected axially mobile to the inner shaft. This list shows that, with the camshaft according to the invention, a floating bearing of the inner shaft, a floating bearing on the outer shaft or a floating bearing of both shafts with respect to the phase adjuster are possible options, wherein in the latter case the camshaft has to be mounted in another way in the axial direction, i.e. not by means of the phase adjuster.

The present invention is also based on the general idea of providing an internal combustion engine with at least one such camshaft, wherein such an internal combustion engine exploits the advantages of the camshaft according to the invention, in particular is easier to assemble and enables a greater compensation of manufacturing tolerances.

Further important features and advantages of the invention emerge from the sub-claims, from the drawings and from the associated description of the figures with the aid of the drawings.

It is understood that the aforementioned features and the features yet to be explained below can be used not only in the combination stated in each case, but also in other combinations or in isolation, without departing from the scope of the present invention.

Preferred examples of embodiment of the invention are represented in the drawings and will be explained in greater detail in the following description, wherein identical reference numbers relate to identical or similar or functionally identical components.

BRIEF DESCRIPTION OF THE DRAWINGS

In the Figures, in each case diagrammatically.

DETAILED DESCRIPTION

Figure 1:
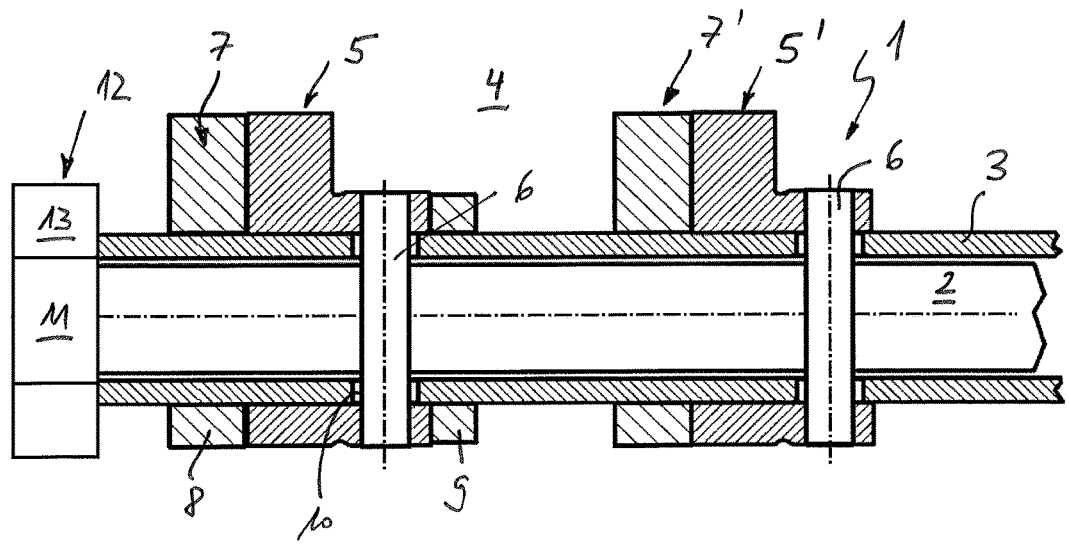
FIGS. 1 to 4 each show various examples of a camshaft according to the invention.
Figure 2:
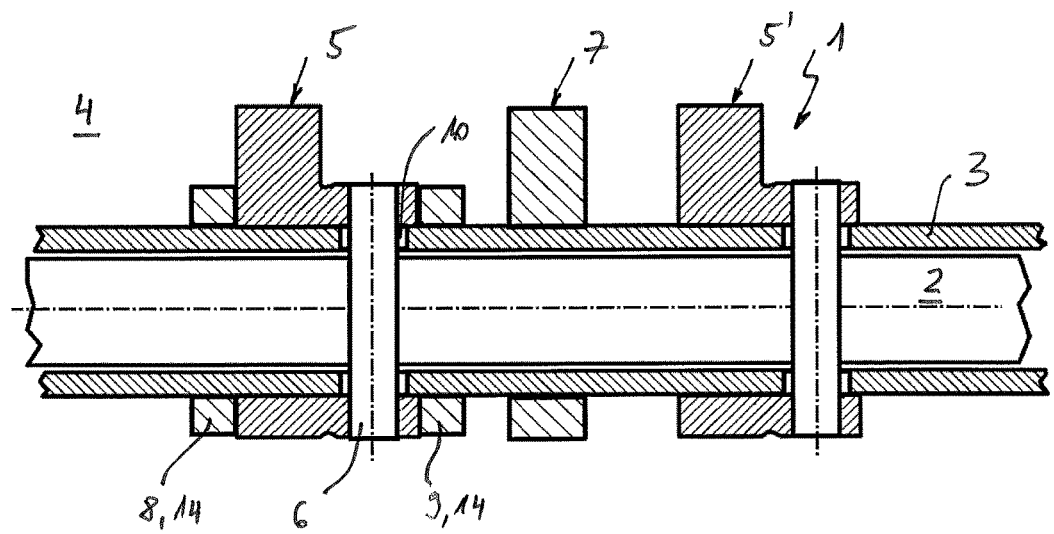
Figure 3:
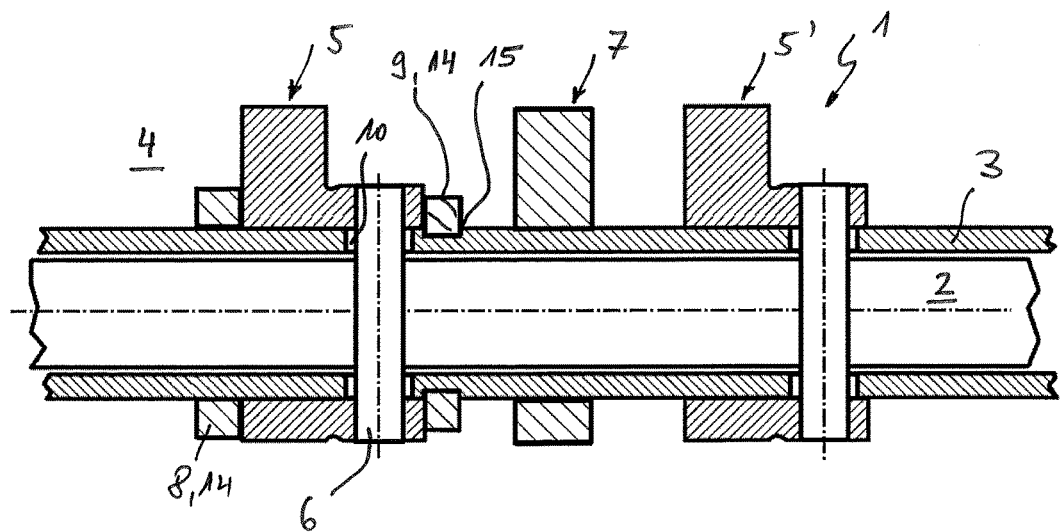

According to FIGS. 1 to 4, an adjustable camshaft 1 according to the invention comprises an inner shaft 2 as well as an outer shaft 3 disposed coaxial therewith. Camshaft 1 can be installed for example in an internal combustion engine 4 of a motor vehicle. Moreover, camshaft 1 comprises a first cam 5, which is connecting non-rotatably by a pin 6 to inner shaft 2, and a second cam 7, which is connecting non-rotatably to outer shaft 3. According to the invention, at least two bearing elements 8, 9 fixedly connected to the outer shaft are provided, between which bearing elements first cam 5 is disposed and which mount and fix first cam 5 and, via the latter, also inner shaft 2 in the axial direction with respect to outer shaft 3. When FIGS. 1 to 4 are examined more closely, it can be seen that pin 6 passes through inner shaft 2 free from play and is also connected free from play to first cam 5. An elongated hole 10 extending in the circumferential direction is provided in outer shaft 3, through which elongated hole pin 6 passes through outer shaft 3. In order to enable a long-term low-force adjustment of inner shaft 2 relative to outer shaft 3, a play-free guidance of pin 6 in elongated hole 10 must be ensured, which however is only possible by means of a suitable axial bearing of outer shaft 3 relative to inner shaft 2. Hitherto, for example, inner shaft 2 was coupled fixedly in the axial direction to a rotor 11 of a phase adjuster 12 and outer shaft 3 was coupled fixedly in the axial direction to a stator 13 of phase adjuster 2. By means of camshaft 1 according to the invention, this is no longer necessary, because here, for example, inner shaft 2 can be mounted in the axial direction floating with respect to rotor 11 of phase adjuster 12, as long as for example outer shaft 3 is connected fixedly in the axial direction to stator 13 of phase adjuster 12. This is of course also conceivable in reverse, so that for example outer shaft 3 can be mounted in the axial direction floating with respect to stator 13 of phase adjuster 12, if for example inner shaft 2 is mounted fixedly in the axial direction with respect to rotor 11 of phase adjuster 12, because with camshaft 1 according to the invention an axial fixing of inner shaft 2 relative to outer shaft 3 does not take place by means of phase adjuster 12, but by means of bearing elements 8, 9. Purely theoretically, it is of course also feasible for both inner shaft 2 and outer shaft 3 to be mounted axially floating with respect to phase adjuster 12, i.e. axially floating with respect to a rotor 11 and to stator 12, wherein in this case a different kind of axial bearing of camshaft 1 must of course take place.

When FIGS. 1 to 4 are examined, it can be seen that further additional first cams 5' and second cams 7' can of course also be present apart from first cam 5 and second cam 7, wherein the axial bearing of camshaft 1 usually takes place by means of first cam 5, which is disposed directly adjacent to phase adjuster 12. At least one bearing element 8, 9, according to FIG. 1 bearing element 8, is particularly preferably constituted as second cam 7, so that second cam 7 at the same time forms first bearing element 8 and an additional first bearing element 8 does not have to be provided.

At least one of bearing elements 8, 9 can of course also be constituted as a bearing ring 14, as is represented according to FIGS. 1 to 4 also in different embodiments. Thus, according to FIG. 1 only bearing element 9, according to FIG. 2 and FIG. 3 both bearing elements 8, 9 and according to FIG. 4 only bearing element 8 is constituted as a bearing ring 14. At least one bearing element 8, 9, in particular a bearing element 9 constituted as a bearing ring 14, can engage, in particular engage in a form-fit manner, in a groove 15 (see FIG. 3) on outer shaft 3, wherein both bearing elements 8, 9 can of course also be fixed in a form-fit manner in the axial direction on outer shaft 3 by means of such grooves 15.

If bearing element 8, 9 is constituted for example as second cam 7 or as bearing ring 14, axial fixing of bearing elements 8, 9 can also take place by means of a thermal joint fitting, by welding, by soldering, by adhesive bonding or by a press-fit on outer shaft 3.

Figure 4:
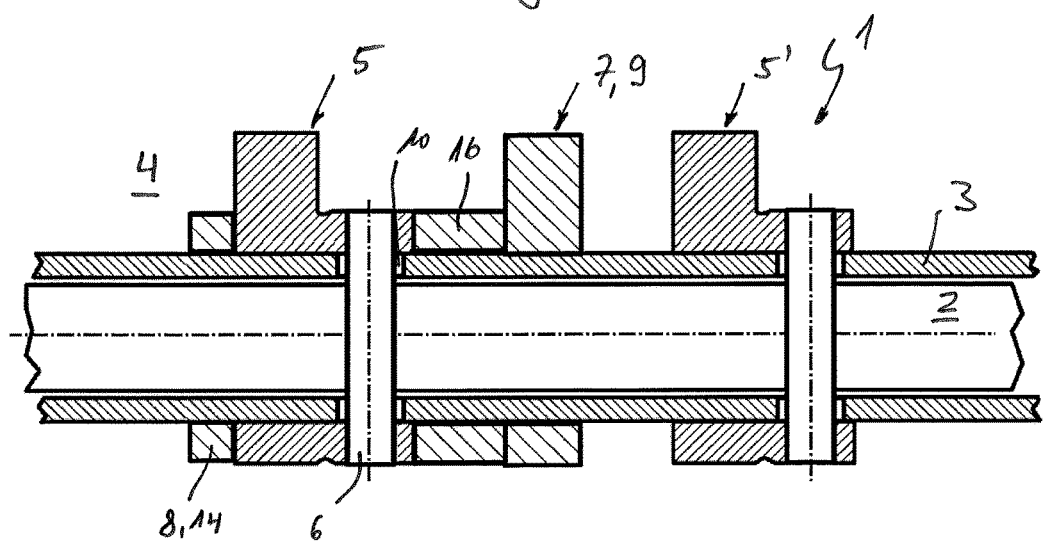

A further possible embodiment of camshaft 1 according to the invention is shown according to FIG. 4, wherein a distance element 16, in particular in the manner of a sleeve, is disposed between first cam 5 and bearing element 9. Second bearing element 9 is constituted in this case as second cam 7, which anyhow is connected axially fixed on outer shaft 3. By means of such a sleeve 16, it is also possible to use a second cam 7 disposed spaced apart from first cam 5 as bearing element 9 and to provide only one additional bearing element 8, in order to fix first cam 5 in the axial direction on outer shaft 3 and also to fix inner shaft 2 in the axial direction by means of pin 6 via first cam 5 fixed in the axial direction.

With camshaft 1 according to the invention and internal combustion engine 4 according to the invention, it is possible for the first time to create a camshaft 1, wherein axial bearing of inner shaft 2 relative to outer shaft 3 takes place by means of outer shaft 3 or, conversely, axial bearing of outer shaft 3 relative to inner shaft 2 takes place by means of inner shaft 3, so that either inner shaft 2 or outer shaft 3 can be mounted floating with respect to a rotor 11 or a stator 12 of a phase adjuster 12 and the possibility of being able to compensate for manufacturing tolerances is thus provided. Purely theoretically, a floating bearing of both shafts 2, 3 relative to phase adjuster 12 is also conceivable, wherein in this case camshaft 1 according to the invention would have to be mounted in the axial direction in a different way.

The invention claimed is:

1. An internal combustion engine, comprising:
   a phase adjuster including a rotor and a stator;
   a camshaft rotatable about a rotation axis, the camshaft including:
   an inner shaft and an outer shaft disposed coaxial therewith, the inner shaft operably coupled to the rotor and the outer shaft operably coupled to the stator;
   a first cam connected non-rotatably to the inner shaft;
   a second cam connected non-rotatably to the outer shaft;
   at least two bearing elements connected fixedly to the outer shaft, wherein the first cam is disposed between the at least two bearing elements and the at least two bearing elements fix the first cam in an axial direction on the outer shaft, and wherein the at least two bearing elements via the first cam fix and mount the inner shaft in the axial direction relative to the outer shaft; and
   wherein at least one of (i) the inner shaft is connected axially mobile to the rotor such that the inner shaft is mounted axially floating with respect to the rotor, and (ii) the outer shaft is connected axially mobile to the stator such that the outer shaft is mounted axially floating with respect to the stator.

2. The internal combustion engine according to claim 1, wherein the first cam and the at least two bearing elements are disposed in a region of the phase adjuster.

3. The internal combustion engine according to claim 1, wherein the at least two bearing elements include a first bearing element defined by the second cam and a second bearing element defined by a bearing ring having a radial extent less than that of the first cam, and wherein the second bearing element is disposed between the first cam and the phase adjuster.

4. The internal combustion engine according to claim 3, wherein the camshaft further includes an axially elongated sleeve disposed between the first cam and the first bearing element defined by the second cam, the axially elongated sleeve supported at an axial end on the first cam and at another axial end on the first bearing element such that the first cam is fixed and supported in the axial direction between the first bearing element via the axially elongated sleeve and the second bearing element.

5. The internal combustion engine according to claim 1, wherein the inner shaft is connected axially mobile to the rotor and the outer shaft is connected axially fixed to the stator to provide a floating axial bearing of the inner shaft with respect to the phase adjuster.

6. The internal combustion engine according to claim 1, wherein at least one of the at least two bearing elements engages a groove on the outer shaft and is fixed in the axial direction.

7. The internal combustion engine according to claim 1, wherein the outer shaft has an elongated hole extending circumferentially to the rotation axis and the first cam is connected non-rotatably to the inner shaft via a pin, the pin connected free from play to the first cam and passes free from play through the inner shaft, and wherein the pin is arranged within the elongated hole in a play-free manner relative to the axial direction to provide a play-free guidance of the pin in the elongated hole during a relative adjustment of the inner shaft with respect to the outer shaft.

8. An adjustable camshaft for an internal combustion engine, comprising:
   an inner shaft;
   an outer shaft disposed coaxially with the inner shaft with respect to a rotation axis, the outer shaft having an elongated hole extending circumferentially to the rotation axis;
   a first cam connected non-rotatably to the inner shaft via a pin extending through the elongated hole, wherein the pin is connected free from play to the first cam and passes free from play through the inner shaft;
   a second cam connected non-rotatably to the outer shaft;
   at least two bearing elements connected fixedly to the outer shaft, wherein the first cam is disposed between the at least two bearing elements; and
   a phase adjuster including a rotor and a stator, the rotor operably coupled to the inner shaft and the stator operably coupled to the outer shaft, wherein at least one of (i) the inner shaft is connected axially mobile to the rotor such that the inner shaft is mounted axially floating with respect to the rotor, and (ii) the outer shaft is connected axially mobile to the stator such that the outer shaft is mounted axially floating with respect to the stator;
   wherein the at least two bearing elements fix and mount the first cam in an axial direction on the outer shaft such that the first cam via the pin fixes the inner shaft in the axial direction relative to the outer shaft, and wherein the pin passes through the elongated hole in a play-free manner relative to the axial direction.

9. The camshaft according to claim 8, wherein the pin axially engages an edge of the elongated hole in the outer shaft to provide a play-free guidance of the pin in the elongated hole with respect to the axial direction to facilitate rotational adjustment of the inner shaft relative to the outer shaft.

10. The camshaft according to claim 8, further comprising another first cam and another second cam, wherein only the first cam is fixed by the at least two bearing elements.

11. The camshaft according to claim 8, wherein at least one of the at least two bearing elements is defined by the second cam.

12. The camshaft according to claim 8, wherein at least one of the at least two bearing elements is structured as a bearing ring defining a radial extent in a radial direction of the rotation axis and an axial extent in the axial direction that are less than that of the first cam.

13. The camshaft according to claim 8, wherein at least one of the at least two bearing elements is fixed on the outer shaft by at least one of a thermal joint fitting, a weld joint, a soldered connection, an adhesive bond and a press-fit.

* * * * *